United States Patent
Litman

(10) Patent No.: US 12,052,554 B2
(45) Date of Patent: Jul. 30, 2024

(54) AUDIO SYNCHRONIZATION USING BLUETOOTH LOW ENERGY

(71) Applicant: Zoom Video Communications, Inc., San Jose, CA (US)

(72) Inventor: Saar Litman, Montclair, NJ (US)

(73) Assignee: Zoom Video Communications, Inc., San Jose, CA (US)

(*) Notice: Subject to any disclaimer, the term of this patent is extended or adjusted under 35 U.S.C. 154(b) by 206 days.

(21) Appl. No.: 17/948,756

(22) Filed: Sep. 20, 2022

(65) Prior Publication Data

US 2024/0098413 A1   Mar. 21, 2024

(51) Int. Cl.
| H04R 3/12 | (2006.01) |
| H04M 3/56 | (2006.01) |
| H04W 4/80 | (2018.01) |
| H04W 76/11 | (2018.01) |

(52) U.S. Cl.
CPC .............. *H04R 3/12* (2013.01); *H04M 3/568* (2013.01); *H04W 4/80* (2018.02); *H04W 76/11* (2018.02); *H04M 2250/02* (2013.01)

(58) Field of Classification Search
CPC .......... H04R 3/12; H04M 3/56; H04M 3/568; H04M 2250/02; H04W 4/80; H04W 76/11
USPC ..................... 379/202.01, 207.01; 381/77, 79
See application file for complete search history.

(56) References Cited

U.S. PATENT DOCUMENTS

| 7,209,795 B2 | 4/2007 | Sullivan et al. |
| 7,672,465 B2 | 3/2010 | Iwamura |
| 9,319,532 B2 | 4/2016 | Bao et al. |
| 9,319,782 B1 | 4/2016 | Crump et al. |
| 9,509,852 B2 | 11/2016 | Thapa et al. |
| 2004/0146031 A1* | 7/2004 | Jukarainen ........ H04M 1/72412 370/337 |
| 2012/0082424 A1 | 4/2012 | Hubner et al. |
| 2014/0348327 A1 | 11/2014 | Linde et al. |
| 2015/0019231 A1* | 1/2015 | Sadler ................... G16H 10/60 705/2 |
| 2015/0215497 A1 | 7/2015 | Zhang et al. |
| 2015/0358171 A1 | 12/2015 | Rosenberg |
| 2017/0019201 A1 | 1/2017 | Williams et al. |

(Continued)

OTHER PUBLICATIONS

What is Dante?, Audinate, Dante Pro AV Networking, https://www.audinate.com/meet-dante/what-is-dante, Sep. 20, 2022, 4 pages.

(Continued)

*Primary Examiner* — Harry S Hong
(74) *Attorney, Agent, or Firm* — Young Basile Hanlon & MacFarlane, P.C.

(57) ABSTRACT

A Bluetooth Low Energy (BLE) beacon packet is transmitted by a device. The BLE beacon packet includes a conference identifier of a conference and a self-clock indicative of an audio frame of an audio stream of the conference received at the device. The device is connected to the conference. BLE beacon packets are received at the device. Each received BLE beacon packet includes a received clock. The received clock is indicative of an audio frame of the audio stream at a device that transmitted the received BLE beacon packet. The self-clock or one of the received clocks as a master clock is selected. Audio frames of the audio stream are output via an external speaker of the device based on the master clock.

20 Claims, 11 Drawing Sheets

(56) References Cited

U.S. PATENT DOCUMENTS

2017/0286051 A1   10/2017  Mendes et al.
2022/0303502 A1*  9/2022  Fisher .................... G10L 15/26

OTHER PUBLICATIONS

Wikipedia, Audio Video Bridging, https://en.wikipedia.org/wiki/Audio_Video_Bridging, Jan. 5, 2022, 9 pages.
Argenox, BLE Advertising Primer, argenox.com/library/bluetooth-low-energy/ble-advertising-primer, Sep. 20, 2022, 8 pages.

* cited by examiner

AUDIO SYNCHRONIZATION USING BLUETOOTH LOW ENERGY

FIELD

This disclosure relates generally to conference management and, more specifically, to using Bluetooth low energy for audio synchronization.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
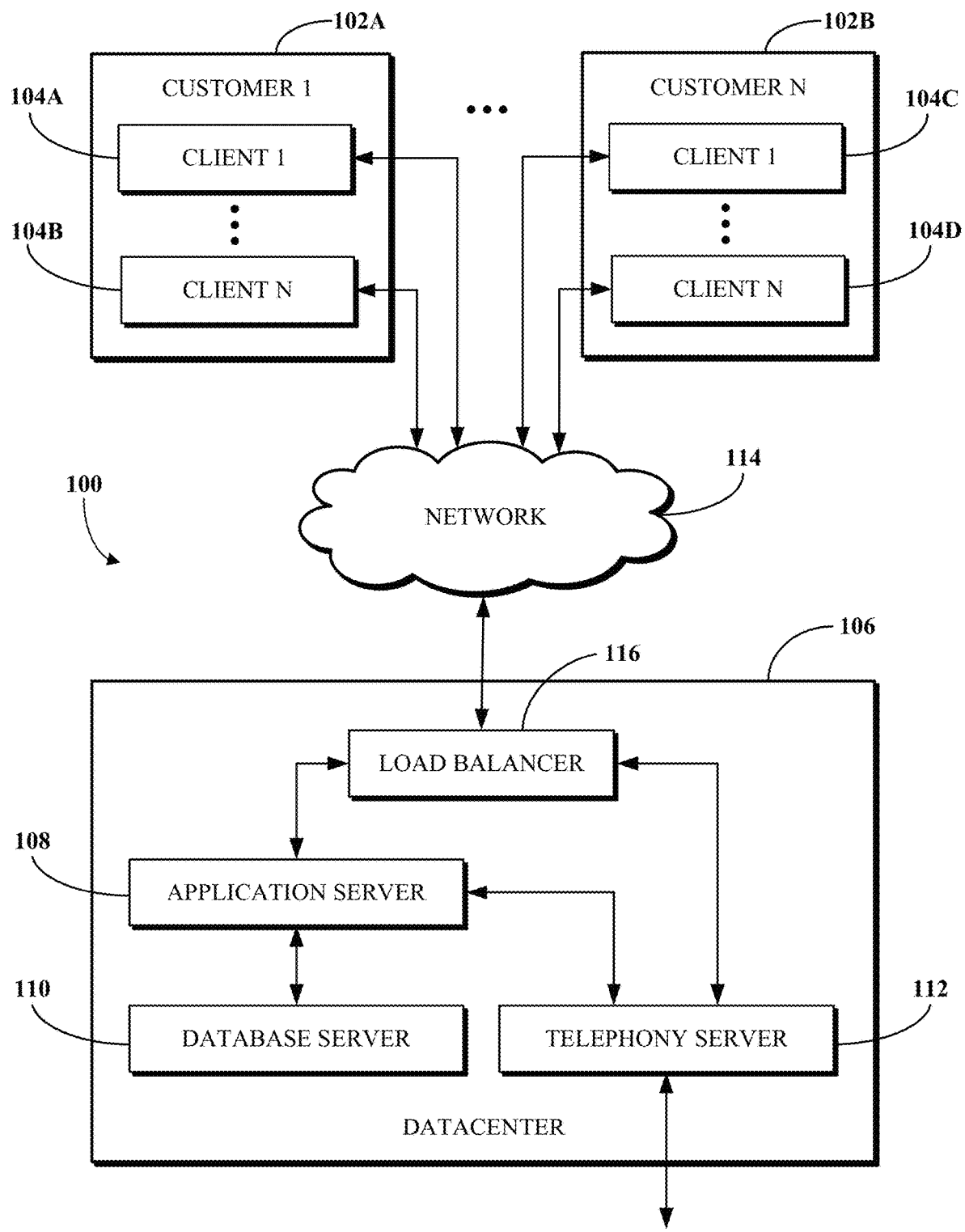
FIG. 1 is a block diagram of an example of an electronic computing and communications system.

A conference (an audio or an audio-visual conference) may include several participants who may be connected to the conference using respective devices. When a participant speaks, an audio stream may be transmitted from the device of that participant to a server, which in turns transmits the audio stream (or a derivative stream therefrom) to at least some of the devices of the other participants. The server may, for example, be a server of a unified communications as a service (UCaaS) platform that provides communication services. For example, the server, when used for a UCaaS platform, may implement conferencing software of the UCaaS platform.

A problem exists with conferences where echo (or a delay effect) may be heard when audio is output from multiple external speakers that are co-located (i.e., proximal to each other or within the same physical location). To illustrate, at least a subset of co-located conference participants may choose to have the received audio stream output using their respective external speakers. That is, a group of conference participants may be sitting nearby one another and may have a same audio stream from a conference output at each of their own devices. As another example, a conference participant may participate in a conference using multiple devices (e.g., using a mobile phone and a personal computer) simultaneously where the external speakers of each of the devices may be turned on.

An external speaker (i.e., an audio output device), as used herein, refers to a speaker the output of which can be heard by more than one person. An external speaker is distinguished from a personal speaker (such, as a headphone, a headset, or earbuds). Stated another way, an external speaker is a speaker configured other than for personal use in consuming audio content output from a computing device to which the speaker is connected. A device of a conference participant that plays (e.g., outputs or otherwise causes the output of) an audio stream via a speaker is referred to herein as a playback device.

The echo problem described above occurs because audio may be output slightly out of sync by the respective receiving devices. When the delay approaches or exceeds roughly one millisecond, the echo resulting from the delay becomes perceptible to a listener. In such a case, the playing (e.g., outputting or causing of output) of the audio at the various devices may be considered to be occurring at different times. Even if the audio streams are received by each of those devices at exactly the same time, the devices may still output the audio at different times. To illustrate, one device may be slower at decoding the received audio than another device because the slower device may have a slower processing unit, may have less available memory, or may be executing more applications. Thus, a listener as one of the participants nearby the co-located devices in such a case receives the same audio at slightly different times from each of the multiple devices.

The problem of synchronizing the playback of audio is known as, or may be referred to as, the clock synchronizing problem. A "clock" or "synchronization clock," as used herein, can include or otherwise refer to data that co-located devices transmit and receive and which the devices use to output a same frame of audio at the certain time. Playing the same audio frames at the same time should be interpreted to mean that the audio frames are played by respective devices within such time that no echo is perceptible (e.g., less than one millisecond apart). To illustrate, if audio is output by two devices within 50 microseconds (µs) or 100 µs, then no echo will be heard.

Existing solutions to the problem of out-of-sync output of audio leverage a same network (e.g., an internet-protocol (IP)-based network) connection between all playback devices to share a single main clock signal. A master clock signal may be transmitted to playback devices on the network, and the playback devices output the audio according to the master clock. The master clock may be set or selected by a dedicated device. The dedicated device may be a central server or one of the playback devices. As such, the audio streams and the master clock may be transmitted over the same network.

Providing a clock synchronization solution based on the assumption that playback devices are connected to the same network is not always viable. That is, the solution is not sufficiently generic to cover situations where devices may be on disparate networks. To illustrate, some of the devices may be connected to a WiFi network, some of the devices may be connected to a 3G cellular network, and some other devices may be connected to a 5G cellular network. As such, existing solutions may not be usable in situations where there is no guarantee of a direct connection between all playback devices. A more generic solution that does not rely on the availability of a direct network connection between playback devices is thus desirable.

Implementations of this disclosure address problems such as these by using an out-of-band, one-way communications protocol between co-located devices that the devices use to transmit their respective clocks. "Out-of-band," as used herein, means that the audio data itself and the clock synchronization data are transmitted over different networks, using different network protocols, or both. Each of the devices independently determines which of the received clocks, if any, to use to output audio. That is, each device may receive several clocks from several other devices and the device (or a communications application therein) determines amongst the several received clocks and the clock of the device itself (i.e., the "self-clock") which to use to output audio. Outputting audio according to (or using) a clock can include outputting an audio frame that is determined using the clock. Said another way, the selected clock determines the timing for outputting an audio frame.

A one-way communications protocol may be characterized by the flow of data in one direction where messages may flow from a sender to one or more receivers, but the sender does not wait for or expect feedback (e.g., acknowledgement messages or other messages) from the receivers in response to a transmitted message. The disclosure herein is described mainly with respect to a one-way communications protocol that is based on the Bluetooth Low Energy (BLE) beacon standard. However other one-way communications protocols usable for communications between co-located devices can also be used. To illustrate, Infrared, Near-Field Communication (NFC), Li-Fi, low-power frequency modulation (FM), amplitude modulation (AM), or Single Side Band (SSB) radio signals, or the like, can be used.

In some implementations, conference participant devices can use BLE beacon packets to transmit (e.g., broadcast) information in a one-to-many communication protocol to nearby devices. The device and the nearby devices need not register with or bind to each other. Using BLE beacons, each playback device can transmit its current clock (i.e., its self-clock) at a predefined frequency (e.g., every 2 seconds or 5 seconds). The self-clock may be a time stamp or an audio frame number. The frame number may be a frame number of a currently (i.e., at the time of the transmission) playing audio frame. The frame number may be a frame number of an audio frame that is to be played subsequent to the currently playing audio frame. The transmission can be received by the nearby devices. The device and the nearby devices select a master timing clock from amongst the self-clock and the received clocks based on predefined parameters or rules. Accordingly, the devices can adjust their respective playback buffer sizes and play the audio/video stream in a synchronized manner.

To describe some implementations in greater detail, reference is first made to examples of hardware and software structures used to implement using Bluetooth low energy for audio synchronization. The playback devices may be connected to disjointed networks. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client. In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
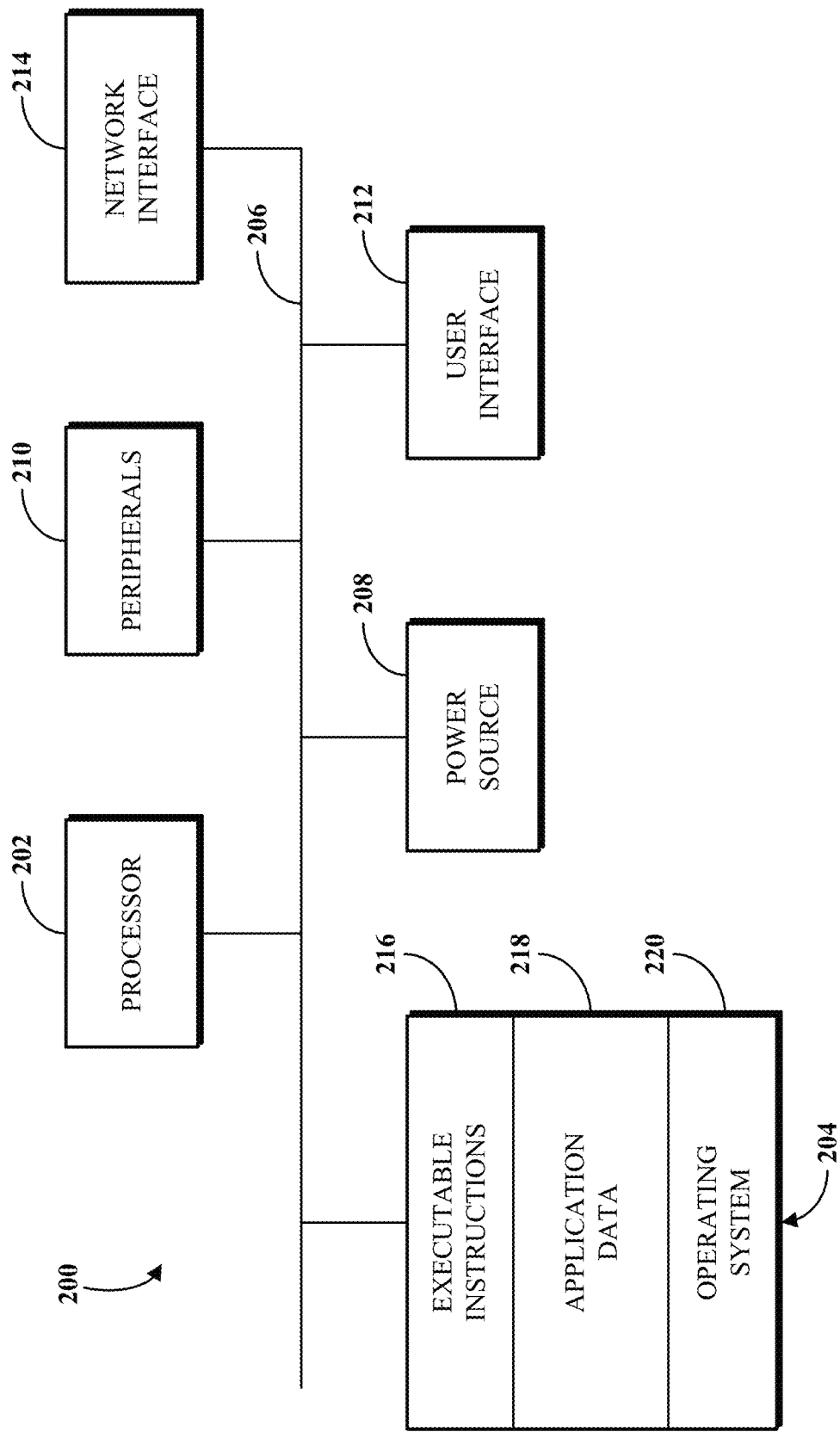
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), IP, power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
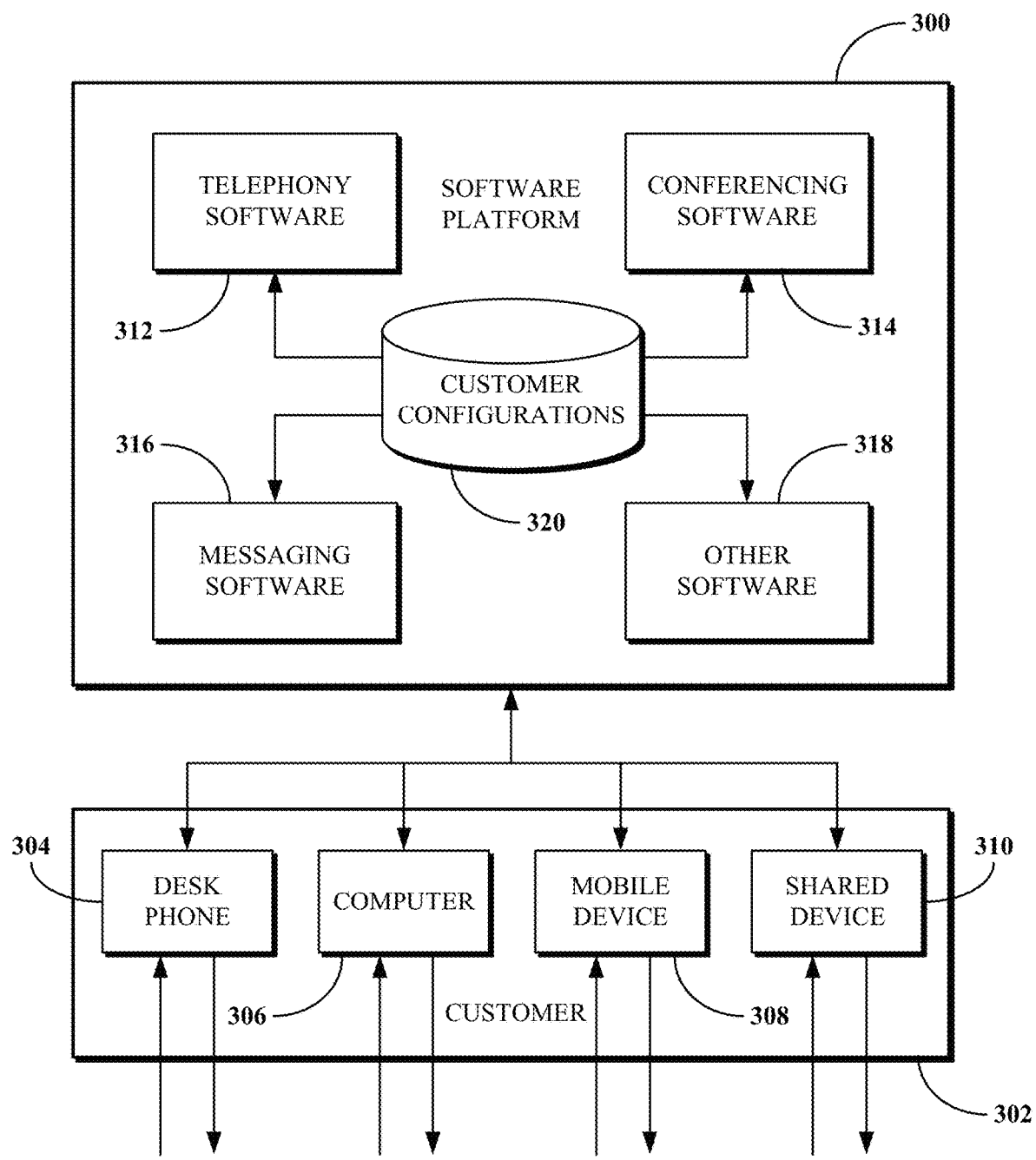
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
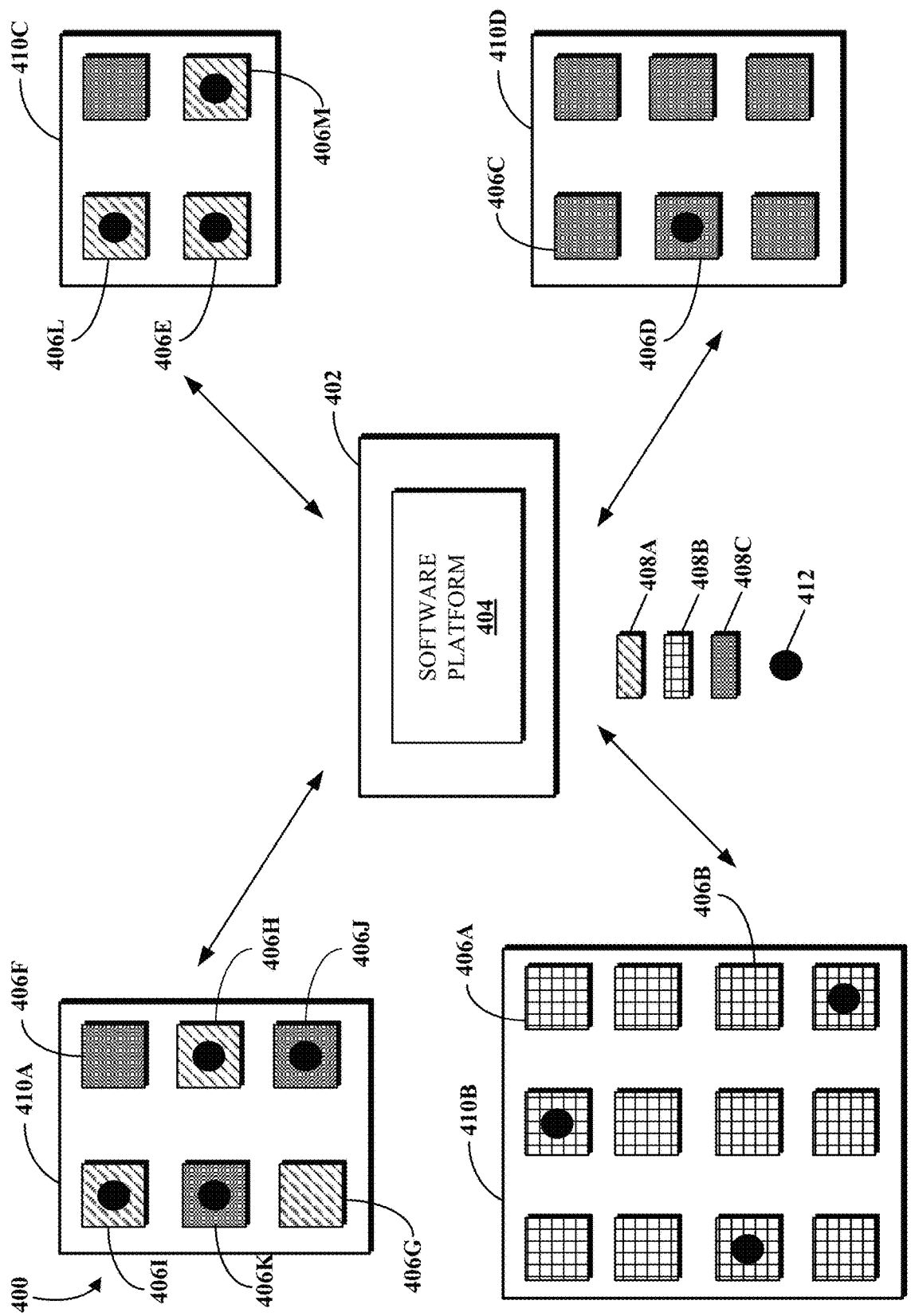
FIG. 4 is an example of an environment where audio playback synchronization between nearby devices can be used.

FIG. 4 is an example of an environment 400 where audio playback synchronization between nearby devices can be used. The environment 400 includes a server 402 that implements a software platform 404, which may, for example, be the software platform 300 of FIG. 300. As such, the server 402 includes or implements conferencing services that may be provided or enabled by a conferencing software, such as the conferencing software 314 of FIG. 3.

In FIG. 4, each square box depicts a device of a respective conference participant. Examples of such conference participant devices include devices 406A-406M. Each pattern (such as each of patterns 408A, 408B, 408C) illustrates a respective conference. That is, all of the devices in FIG. 4 that have the same pattern are assumed to be devices connected to the same conference. FIG. 4 illustrates that three conferences (corresponding to the patterns 408A, 408B, 408C) are currently ongoing. However, the disclosure is not so limited and other numbers of conferences can by concurrently facilitated by the software platform 404. Additionally, while a certain number of devices are shown as being connected to the ongoing conferences, the disclosure is not so limited and more or fewer number of devices can be connected to an ongoing conference.

FIG. 4 further illustrates that the devices are located at different physical locations (i.e., locations 410A-410D). The location 410A may be an open-space office (i.e., a type of office layout where all employees work on the same floor and in the same open space), the location 410B may be a large conference room, the location 410C may be a public location (e.g., a coffee shop), and the location 410D may also be a conference room. Other examples of the locations 410A-410D are possible. Devices that include a black circle (such as the circle 412) are devices that are outputting received audio of the respective conferences via external speakers.

At least some of the conference participant devices of FIG. 4 may have a configuration as described with respect to FIG. 5, below. As such, a device may include a synchronization software, such as a synchronization software 506 of FIG. 5. The synchronization software can be used to synchronize at least the audio playback of devices that are in the same conferences and are co-located (e.g., are within the same physical location). The devices can be co-located such that an echo can be heard if the same audio stream is output from devices. That two devices are co-located can mean that BLE beacon packets transmitted by one device can be received by the other device and a receiving device determines that the BLE signal strength is sufficient to categorize the transmitting device as co-located. For example, the respective synchronization software of the devices 406H and 406I at the location 410A can be used to synchronize the audio playback of the devices 406H and 406I; the respective synchronization software of the devices 406J and 406K at the location 410A can be used to synchronize the audio playback of the devices 406J and 406K; the respective synchronization software of the devices 406E, 406L, and 406M at the location 410C can be used to synchronize the audio playback of the devices 406E, 406L, and 406M; and the respective synchronization software of the devices outputting audio via external speakers at the location 410B can be used to synchronize the audio playback of those devices.

Figure 5:
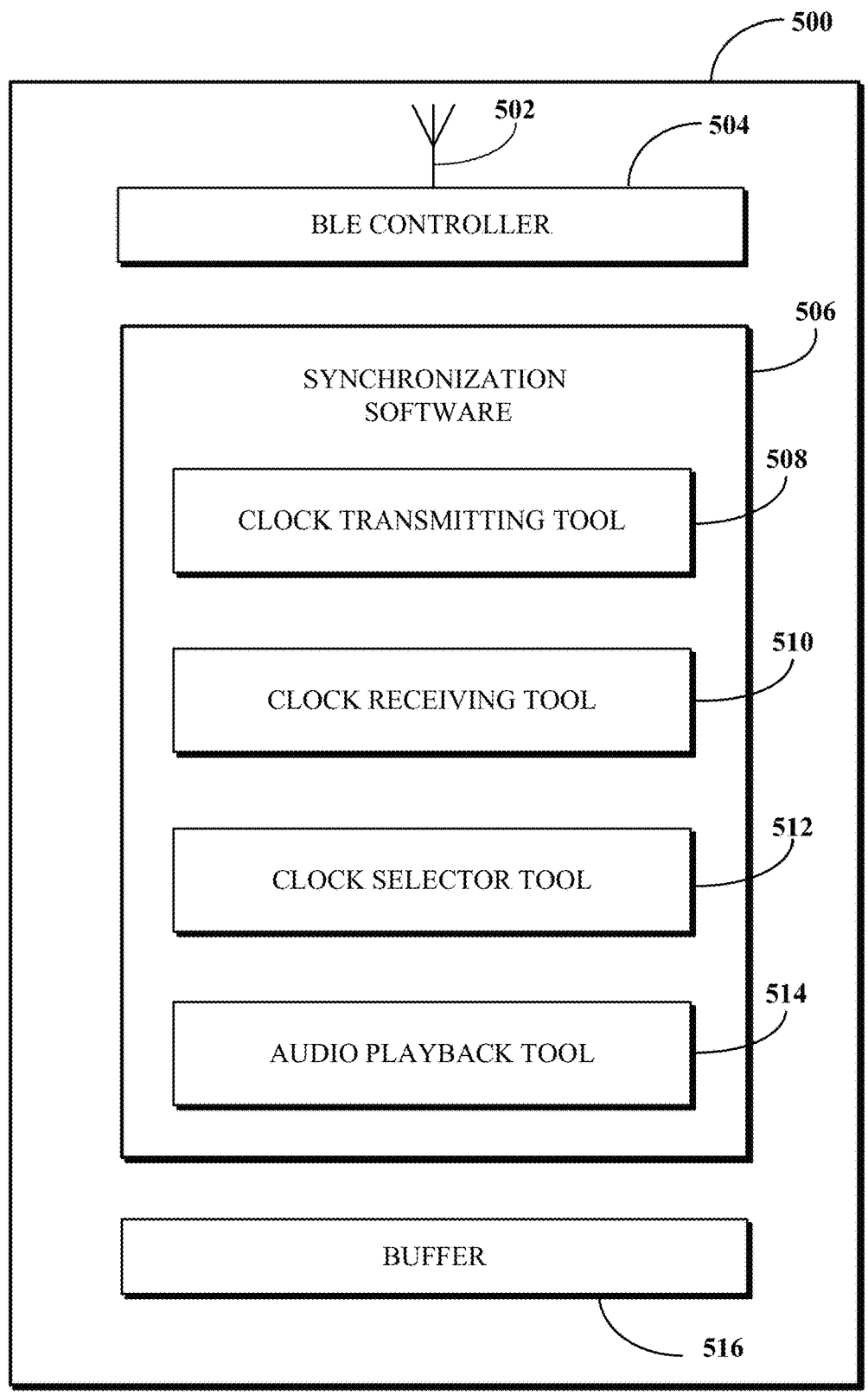
FIG. 5 is an example of a configuration of a user device for synchronizing audio playback.

FIG. 5 is an example of a configuration of a device 500 for synchronizing audio playback. The device 500 may, for example, be or otherwise have a configuration similar to the computing device 200 of FIG. 2. The device 500 includes a transceiver 502. The transceiver 502 may be or include a radio transmitter for transmitting BLE messages and an antenna for receiving BLE messages. The synchronization software 506 uses a BLE controller 504 that causes messages to be transmitted using the transceiver 502 and to receive messages transmitted by other devices using the BLE protocol.

The device 500 is shown as including a buffer 516. The buffer 516 may be or may be included in the memory 204 of FIG. 2. Audio data received at the device 500 may be decoded and stored in the buffer 516 until they are output. The audio data may be stored in the buffer 516 as audio frames. Each audio frame may be associated with a frame number, a time-to-play (i.e., an output time), or both.

As described herein, the device 500 can transmit clock messages (i.e., "clock beacons") and can receive clock messages. In BLE parlance: when the device 500 is transmitting clock messages, it may be referred to as a "broadcaster" and transmit clock messages during "advertising intervals;" and, when the device 500 is receiving clock messages from other devices, it may be referred to as an "observer."

The synchronization software 506 includes tools, such as programs, subprograms, functions, routines, subroutines, operations, executable instructions, and/or the like for, inter alia and as further described below, synchronizing playback with other devices. That is, the synchronization software 506 can be used to synchronize playback at a device that includes or executes the synchronization software 506 with playback at the other devices. The other devices may nearby devices to the device. For example, the synchronization software 506 may be used to transmit (e.g., broadcast) its clock to other devices that may be listening for the broadcast and may be used to receive clocks broadcast by other devices.

At least some of the tools of the synchronization software 506 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the synchronization software 506 includes a clock transmitting tool 508, a clock receiving tool 510, a clock selector tool 512, and an audio playback tool 514. In some implementations, the synchronization software 506 can include more or fewer tools. In some implementations, some of the tools may be combined, some of the tools may be split into more tools, or a combination thereof. The synchronization software 506 can be configured such that, if an external speaker of the device 500 is not turned on, then the clock transmitting tool 508, the clock receiving tool 510, and the clock selector tool 512 do not perform the functions described herein. In an example, the synchronization software 506 may receive an indication (e.g., an input) from a user that the audio stream of the conference is to be played via an external speaker. That is, the user explicitly indicates that the speaker is an external speaker.

The clock transmitting tool 508 may transmit a self-clock of the device 500. The clock transmitting tool 508 interfaces with the BLE controller 504 to transmit the clock of the device 500. The transmission may be referred to herein as a "clock beacon." The self-clock of the device 500 can be an indication (e.g., an audio frame number) of an audio segment received, but not yet output, by the device 500. As further described below, the device 500 may receive the clock of another device. Such a clock is referred to herein as a "received clock."

An audio stream received at the device 500 is typically received as a sequence of audio frames. To illustrate, each audio frame may include roughly 1 milliseconds of audio; however, the length of audio data in a frame may depend on a sampling rate used at the source where the audio is captured or otherwise assembled for delivery to the device 500. As can be appreciated, the audio frames may be received in a compressed format. As such, and while not specifically shown in FIG. 5, the device 500 may include an audio decoder for decoding the received audio frames. In an example, the audio playback tool 514 may be or include the audio decoder. The device 500 may also include a video decoder that can be used to decode video data of an audio-video conference.

As already mentioned, each of the audio frames may have a frame number, such as a sequence number. The frame number can be used by the audio decoder to determine a timestamp (i.e., a time-to-play) at which the audio frame is to be output. In an example, the self-clock of the device 500 can be based on an audio frame number or, equivalently, a corresponding playback timestamp. As such, the clock beacon may be based on or include an audio frame number.

In an example, the self-clock may indicate a current frame number (i.e., the frame number of an audio frame being played at the time that the clock beacon is transmitted). In an example, the self-clock may be a next frame number (i.e., the frame number of a frame that is to be output immediately after the currently played frame). In an example, the self-clock may be a frame number that the device 500 expects to play after a predetermined time. The predetermined time may account for decoding time of audio frames and transmission time of the clock beacon. As such, delays can be accounted for by the device that is sending the clock beacon. In another example, delays can be accounted for by the receiving devices, as further described below.

As mentioned above, devices in a conference may transmit respective self-clock beacons. As such, and in the case that the next frame number is used as the self-clock, the clock beacons of each device may essentially indicate to the other nearby devices, "I am about to play frame X+1," where X is the frame number of the currently playing audio frame at the device from which the clock beacon is received.

The clock transmitting tool 508 transmits (e.g., causes the BLE controller 504 to transmit) the clock beacons at a regular frequency. To reduce power consumption at the device 500, the clock beacons may be transmitted every 2 seconds, 5 seconds, or some other clock transmission cadence. When the device 500 is not transmitting its self-clock, the device 500 can be receiving clock beacons from other devices. The time period between two transmissions of self-clocks is referred to herein as a "clock receipt interval." The clock transmitting tool 508 may interface with the BLE controller 504 to cause a radio transmitter of the transceiver 502 to be turned on and an antenna of the transceiver 502 to be turned off.

In an example, the device 500 may transmit clock beacons at a higher frequency when it first joins a conference (i.e., during an initial connection period). For example, for the first 5 seconds, 15 seconds, or some other initial connection period, after joining a conference, the device 500 may transmit clock beacons at an initial clock transmission cadence that is different from the clock transmission cadence. The initial clock beacon transmission frequency may be 2 Hz (i.e., 2 clock beacons per second). Transmitting the clock beacons at an initial higher frequency may be used to expedite the process of synchronizing devices since a larger gap in audio playback may occur at the beginning of a conference or when a device initially joins a conference. After devices are synchronized, an amount of drift in playback until a next synchronization cycle is expected to be small and may not be noticeable by the conference participants.

In an example, when a device joins a conference and in response to starting to receive an audio stream of the conference, the synchronization software 506 therein (or in an example, the clock transmitting tool 508) may broadcast a clock request. The clock request indicates to the nearby devices to transmit their respective self-clocks. In response to receiving the clock request, each nearby device that receives the clock request may transmit its self-clock. In an example, if the time between the time of receipt of the clock request and the next time of transmission of the clock beacon exceeds a time threshold, then the nearby device may immediately transmit its self-clock; otherwise, the nearby device transmits the self-clock at the end of the current clock receipt interval. In an example, the clock request may be a BLE beacon packet that includes data indicating to the nearby devices that the BLE beacon packet is a clock request.

Figure 6:
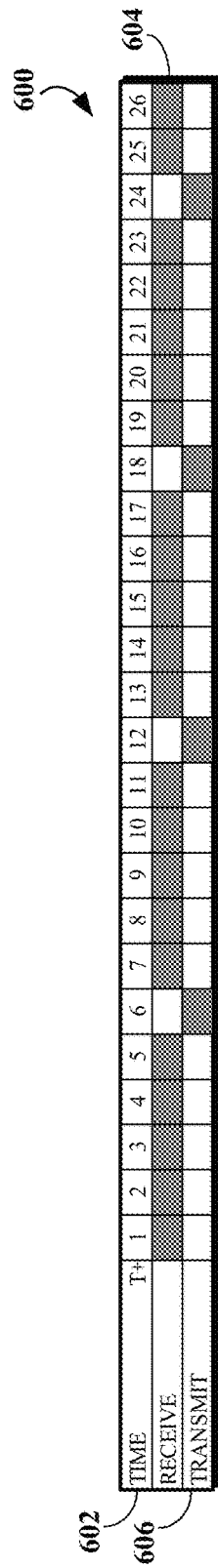
FIG. 6 illustrates an example of transmitting and receiving clock beacons by the device of FIG. 5.

In an example, if no audio data of the conference is received by the device 500 since a last synchronization event, then the clock transmitting tool 508 does not transmit its self-clock during a next transmission time step (described with respect to FIG. 6). To illustrate, the device 500 may experience a transient (or permanent) network outage during which it does receive the audio stream of the conference. In such a situation, the device 500 is not likely to ever receive any audio data transmitted during the outage. As such, there is no reason for other devices to wait for (i.e., synchronize with) the device 500. Rather, the other nearby devices determine the next cycle(s) master clock(s) amongst themselves without considering the self-clock of the device 500.

The clock receiving tool 510 receives clock beacons from other (e.g., nearby or co-located) devices. The clock receiving tool 510 may interface with the BLE controller 504 to turn on an antenna of the transceiver 502 so that any block beacons transmitted by other devices can be received. In an example, the BLE controller 504 may be configured to provide received clock beacons to the clock receiving tool 510. For example, the BLE controller 504 may provide a subscription service (or subscription API) that enables the clock receiving tool 510 to register an interest in receiving clock beacons. To illustrate, the clock receiving tool 510 may register an interest in receiving clock beacons that include a conference ID that is equal to the conference ID of the device 500. Registering an interest with the BLE controller 504 may include providing a callback function to the BLE controller 504, which the BLE controller 504 uses to pass received clock beacons that match the interest to.

FIG. 6 illustrates an example 600 of transmitting and receiving clock beacons by the device 500 of FIG. 5. A timeline 602 illustrates timesteps that are offset from a time T. A row 604 illustrates that the device 500 listens for clock beacons in each of five consecutive timesteps; and a row 606 illustrates that the device 500 transmits its self-clock every $6^{th}$ time step. The device 500 may receive clock beacons from different nearby devices in the different time steps. It may occur that a first device may transmit a self-clock that is audio frame X (e.g., audio frame number 1000) and the other devices transmit respective self-clocks that are greater than X (e.g., audio frame numbers that are greater than 1000). However, before determining the master clock for the current cycle, the first device transmits a self-clock X+n that is greater than X (e.g., audio frame number 1020). That is, within a master clock selection cycle, the first device makes two transmissions of its self-clock. In such a situation, the first device may delay outputting audio frame number X+n (if it is output at all) until a new master clock of X+n or greater is set.

Each time step may correspond to a certain number of milliseconds. To illustrate, each time step may correspond to 10 milliseconds. Thus, and according to the example 600, the device 500 listens for clock beacons from other devices for 50 milliseconds, stops receiving for one time step, and then transmits its self-clock in that time step. As such, the clock receipt interval illustrated in example 50 milliseconds. The clock receipt interval is the number of time steps (or, equivalently, the time in milliseconds or seconds) between transmissions of the self-clock.

To avoid interference between transmitters of devices, the BLE controller 504 may add a delay randomizer. That is, for example, while the self-clock is transmitted during a time step 608, the specific moment of transmission may be randomized by the BLE controller 504. The randomization is such that the transmission still completes within the time step 608.

To be clear, the example 600 is a mere illustration. That is, the device 500 may receive for more or fewer time steps. For example, and as already mentioned above, the clock transmission cadence may be every 2 seconds, every 5 seconds, or some other number of seconds. Additionally, while the example 600 illustrates that the device 600 may be configured to receive clock beacons at every time step during which the device 500 is not transmitting the self-clock, that need not be the case. For example, the device 500 may receive (i.e., listen for) clock beacons from other devices according to a configuration of the transceiver 502 by the clock receiving tool 510 of FIG. 5.

Reference is now again made to FIG. 5. The clock selector tool 512 determines (e.g., selects or chooses) a current master clock. A current master clock is the clock to be used until a next determination of a master clock, which the clock selector tool 512 performs after the next clock receipt interval. The master clock can be determined as described with respect to FIG. 10.

In an example, the clock selector tool 512 may be configured to determine the current master clock according to predefined rules or parameters. In an example, the clock selector tool 512 may be configured to select a slowest device amongst a cluster of devices that includes the device 500 itself as the current master clock. The slowest device can be the device whose clock corresponds to the smallest frame number amongst the devices of the cluster. A "cluster of devices" refers to a group of nearby devices (i.e., co-located devices) that are joined to the same conference and that may be using external speakers to output audio.

In an example, the clock selector tool 512 may provide a frame number (i.e., the current master clock) to the audio playback tool 514. The audio playback tool 514 uses the frame number to adjust time-to-play information associated with at least some of the audio frames in the buffer 516. The at least some of the audio frames in the buffer 516 may include one or more of future audio frames (i.e., audio frames that have not yet been output). Alternatively, the clock selector tool 512 may itself adjust the time-to-play information associated with the at least some of the audio frames in the buffer 516. However, if the self-clock is determined to be the master clock, then the clock selector tool 512 may not provide a frame number to the audio playback tool 514 or may not adjust the time-to-play information, as the case may be.

In an example, the clock selector tool 512 may adjust the current master clock based on a determined distance between the device 500 and the device that transmitted the selected master clock. The adjusted current master clock can be provided to the audio playback tool 514 as the current master clock. To illustrate, some BLE protocols may provide ranging Application Programming Interfaces (APIs) that can be used determine a distance to a device that transmitted a beacon. As such, the clock selector tool 512 may use such ranging APIs to determine the distance to the device whose clock is used as the current master clock.

The ranging API may identify a beacon sender as a being within less than one meter (i.e., an immediate state), within 1 to 3 meters (i.e., a near state), within a distance that is larger than 3 meters (i.e., a far state), or in an unknown state. The ranging API can be used to determine whether a device is too far to be included in a cluster. For example, the ranging API may be used to infer whether a device is in a nearby but in different room or is sufficiently far away from other devices in a cluster and, therefore, should not be included in the cluster.

The audio playback tool 514 may be or include an audio decoder. The audio playback tool 514 receives audio data of a conference. The audio data may be received from a conferencing software, which may be the conferencing software 314 of FIG. 3 and which may be part of a software platform, such as the software platform 404 of FIG. 4. The audio playback tool 514 may receive an indication of a frame number that the audio playback tool 514 is to output next. The indication of the frame number that the audio playback tool 514 is to output next may be a frame number or adjustments to time-to-play information, as described with respect to the clock selector tool 512. The audio playback tool 514 may receive, buffer, but not play additional audio data until synchronization is achieved.

While not specifically described herein, and as can be appreciated, synchronizing audio of the conference at a device (such as by slowing down the output of audio at the device) can include synchronizing video of the conference. As such, time-to-play of video frames at the device 500 can also be adjusted to synchronize with the corresponding audio frames lest the video and audio streams become out of sync when played at the device 500.

In an example, if the selected master clock is the self-clock of the device 500, that is, if the synchronization software 506 determines that the device 500 is the slowest amongst its neighboring devices, then the synchronization software 506 may transmit a request to the server to modify encoding parameters used to transmit data to the device 500. For example, by reducing the quality of the received audio, video, or both streams received at the device 500, more data can be received. By increasing the bit rate (i.e., the amount of data received in a unit of time), the device 500 may be able to catch up faster to the other nearby devices.

Figure 7:
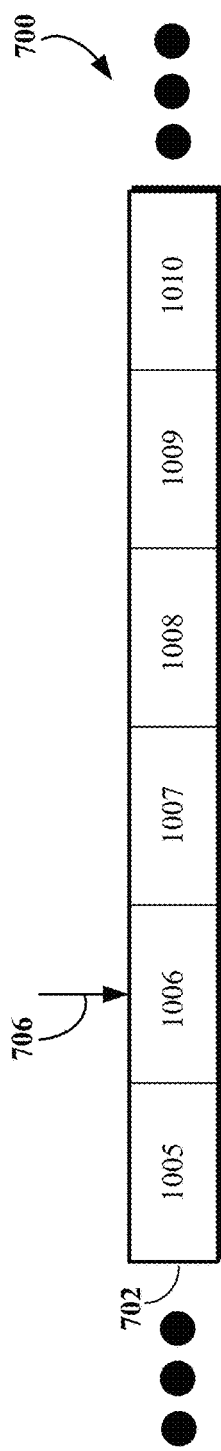
FIG. 7 illustrates an example of using a master clock at the device of FIG. 5.

FIG. 7 illustrates an example 700 of using a master clock at the device 500 of FIG. 5. The example 700 includes a buffer 702 that includes audio frames. The buffer 702 can be the buffer 516 of FIG. 5. The buffer 702 is shown as including audio frames numbered 1005-1010. However, the buffer 702 may include more or fewer audio frames. For example, the buffer 702 may include 5 minutes of audio frames. A current play head 704 indicates that the audio frame numbered 1008 is to be played next at the device 500. An arrow 706 indicates the current master clock, as determined by the clock selector tool 512 of FIG. 5. As such, the slowest device may be about to play the audio frame numbered 1006.

In such a case, playing of the audio frame numbered 1009 is to be delayed until the slowest device is determined to play the audio frame numbered 1009. In the example 700, the slowest device is three audio frames behind the device 500. Assuming that each audio frame corresponds to 20 milliseconds of audio, then the time-to-play information associated with at least the audio frame numbered 1009 is adjusted by 3*20=60 milliseconds. As such, between a current time and the adjusted time-to-play the next audio frame (i.e., the audio frame numbered 1009), the device 500 may not output any audio data.

Figure 8:
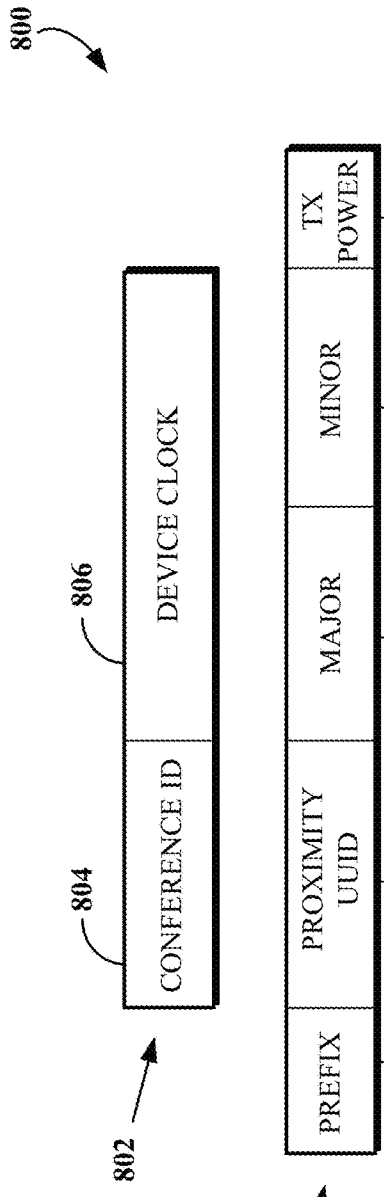
FIG. 8 illustrates examples of clock beacons.

FIG. 8 illustrates examples 800 of clock beacons. A clock beacon portion 802 illustrates at least a portion of a clock beacon that may be transmitted or received by a device, such as the device 500 of FIG. 5. A BLE beacon packet 808 illustrates a clock beacon that is according to the BLE specification.

The clock beacon portion 802 includes a conference identifier 804 and a device clock 806. Each conference hosted by a UCaaS, such as the software platform 404 of FIG. 4, may be assigned a unique conference identifier (ID). This unique conference ID may be transmitted to each device that is connected to the conference. As such, and referring to FIG. 4, the devices indicated by the pattern 408A may receive a first conference ID, the devices indicated by the pattern 408B may receive a second conference ID, and the devices indicated by the pattern 408C may receive a third conference ID. As such, the devices 406G, 406H, and 406I of the location 410A receive the first conference ID; and the devices 406F, 406I, and 406K of the location 410A receive the third conference ID.

By including the conference ID in the clock beacons that are broadcast, a receiving device can identify which clock beacons to ignore and which to process further. That is, those received clock beacons that include the same conference ID as that of a receiving device are used to select a master clock; all other received clock beacons are ignored. The device clocks contained in the device clocks 806 of the received (and further processed) clock beacons are used to identify the master clock.

In an example, the clock beacon may be embedded in a BLE beacon packet (e.g., message). The BLE beacon packet may be formatted according to any BLE-conforming protocol. For example, the BLE beacon packet may be formatted according to the iBeacon protocol, the Eddystone protocol, a custom-developed protocol, or some other protocol.

The BLE beacon packet 808 illustrates a clock beacon packet that is according to the BLE specification. The BLE beacon packet 808 includes a prefix 810, a proximity Universally Unique ID (UUID) 812, a major number 814, a minor number 816, and a transmission power 818. The prefix 810 includes 9 bytes of data. One of the data items included in the prefix 810 indicates the type of the BLE beacon packet 808. The type can be the constant value ADV_NONCONN_IND defined by the BLE specification and that indicates that the BLE beacon packet 808 is an advertisement packet and that the transmitting device (e.g., the device 500 of FIG. 5) does not accept connections.

The proximity UUID 812, the major number 814, and the minor number 816 can be used in any to transmit the conference ID and the device clock. In an example, the proximity UUID 812, which is a 16 byte field, can be used to transmit the conference ID. In an example, the transmitting device can encrypt the conference ID for transmission in the proximity UUID 812. In such a case, a receiving device of the BLE beacon packet 808 would have to decrypt the proximity UUID 812 to obtain the conference ID. In an example, at least one of the major number 814 and the minor number 816, which are each 2 bytes, or both can be used to transmit (i.e., advertise) the clock (e.g., audio timestamp) of the transmitting device to all nearby devices. Details of the transmission power 818 are not necessary to the understanding of this disclosure and are therefore omitted.

Figure 9:
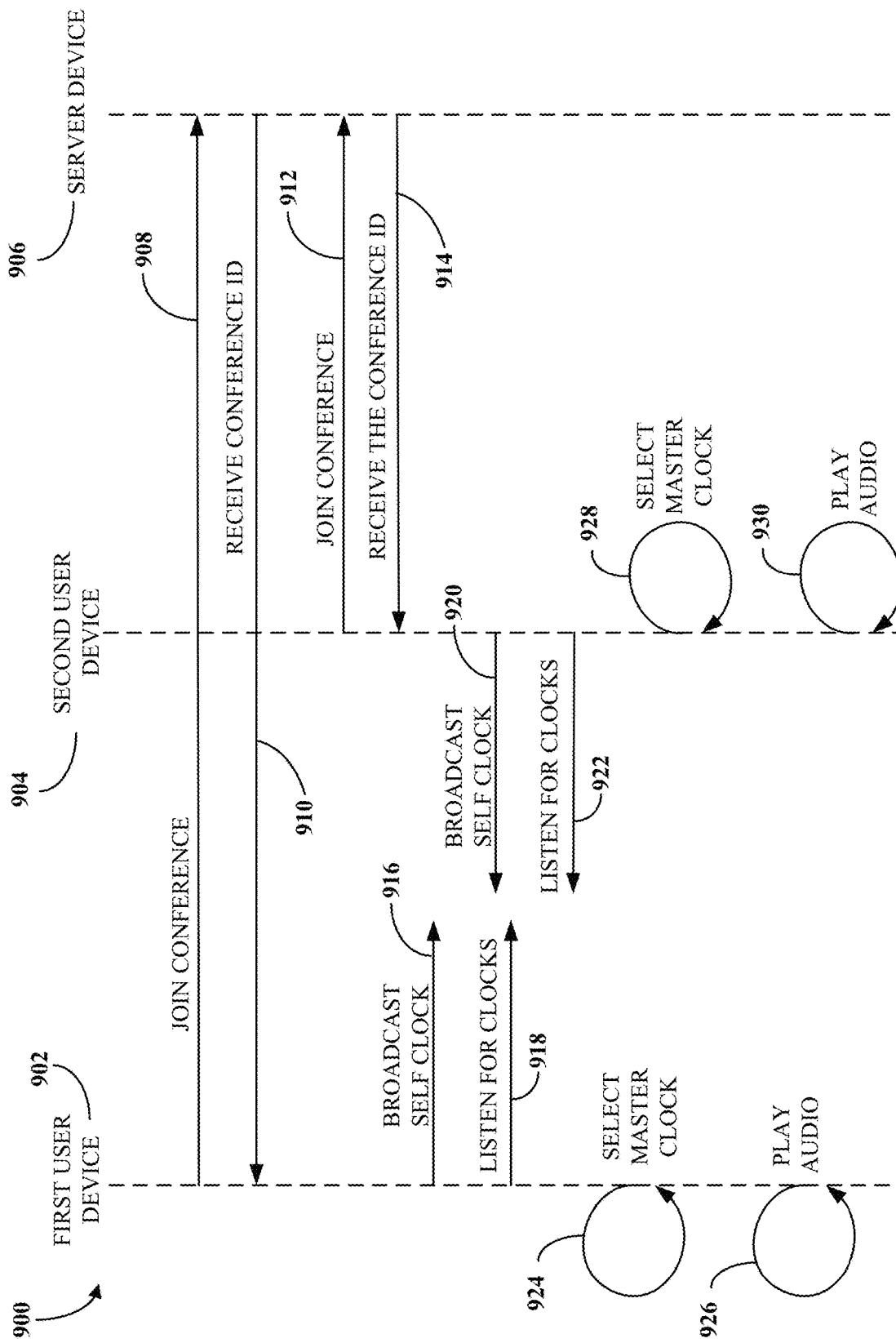
FIG. 9 is an example of an interaction diagram for synchronizing playback between nearby devices.

FIG. 9 is an example of an interaction diagram 900 for synchronizing playback between nearby devices. The interaction diagram 900 illustrates that a first user device 902 and a second user device 904 are joining a conference that is hosted by a server device 906. The first user device 902 and the second user device 904 are assumed to be within the same location such as transmissions (e.g., BLE beacon transmissions) from one of the devices can reach the other. Each of the first user device 902 and the second user device 904 can be as described with respect to the device 500 of FIG. 5. While only two user devices are shown, other user devices within the same location may also join the conference.

At 908, the first user device 902 transmits a request to the server device 906 to join a conference being hosted by the server device 906. More specifically, a conferencing software executing at the first user device 902 transmits a request to a conferencing software available or executing at the server device 906. The server device 906 joins (now shown) the first user device 902 to the conference. At 910, in response to the server device 906 successfully adding the first user device 902 to the conference, the server device 906 transmits a conference ID of the conference to the first user device 902. At 912, the second user device 904 transmits a request to the server device 906 to join the same conference. The server device 906 joins (now shown) the second user device 904 to the conference. At 914, in response to the server device 906 successfully adding the second user device 904 to the conference, the server device 906 transmits the conference ID to the second user device 904.

While not specifically shown in FIG. 9, the first user device 902 and the second user device 904 receive an audio stream of the conference from the server device 906. At 916, the first user device 902 broadcasts its self-clock, as described above. At 918, the first user device 902 listens for transmitted clocks from other nearby devices (e.g., the second user device 904). Similarly, and independently of the first user device 902, at 920, the second user device 904 broadcasts its self-clock. At 922, the second user device 904 listens for transmitted clocks from other nearby devices (e.g., the first user device 902).

At 924, and independently from the second user device 904, the first user device 902 selects a master clock, as described above with respect to FIG. 5. At 926, the first user device 902 plays audio frames of the conference according to the selected master clock. Similarly, and independently from the first user device 902, at 928, the second user device 904 selects a master clock (which is the same master clock selected by the first user device 902). At 926, the second user device 904 plays audio frames of the conference according to the selected master clock.

To further describe some implementations in greater detail, reference is next made to examples of techniques which may be performed for playback synchronizing between nearby devices.

Figure 10:
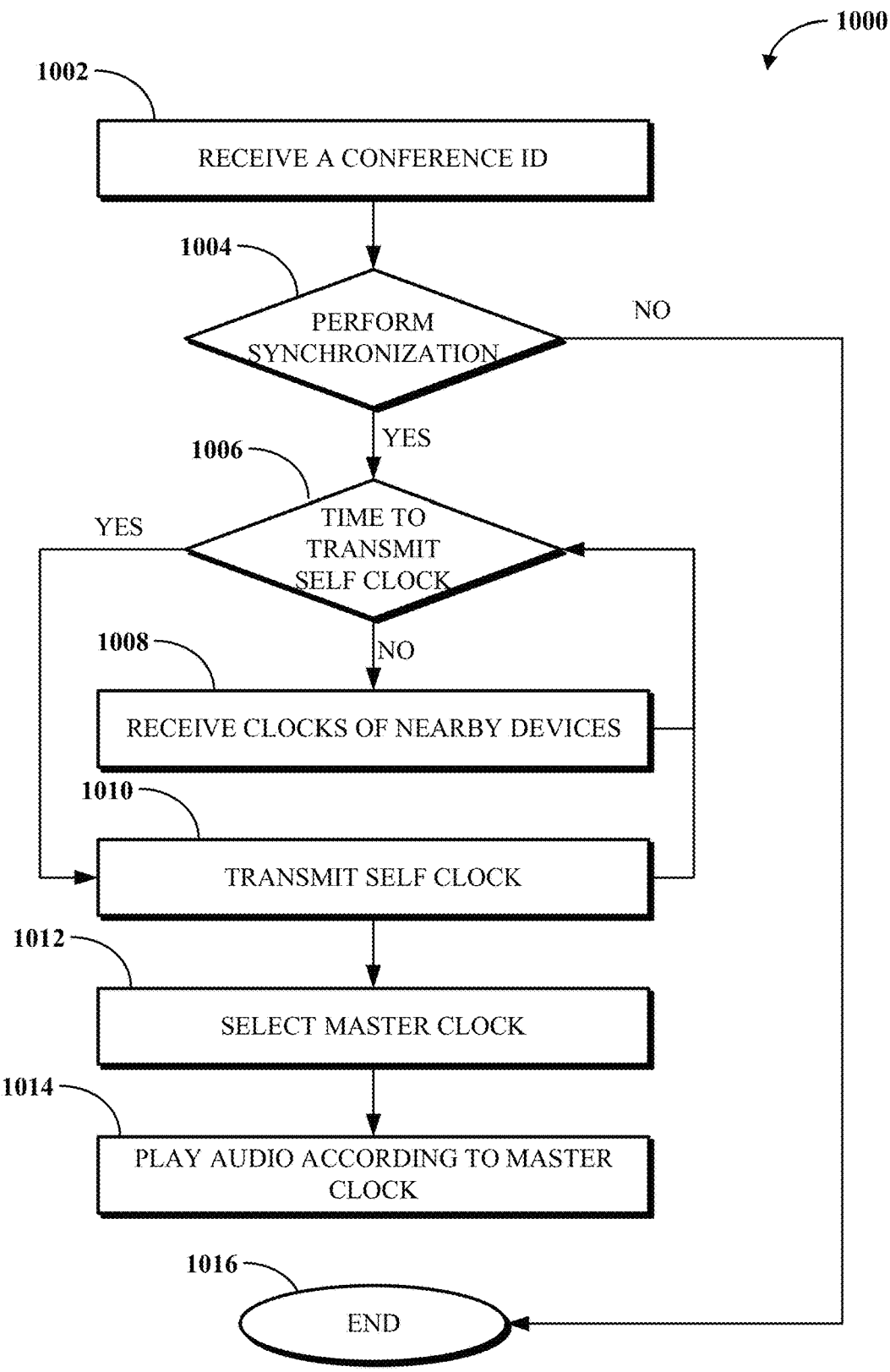
FIG. 10 is a flowchart of an example of a technique for synchronizing playback between nearby devices.

FIG. 10 is a flowchart of an example of a technique 1000 for synchronizing playback between nearby devices. The technique 1000 can be executed using computing devices, such as the systems, hardware, and software described with respect to FIGS. 1-9. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof. The technique 1000 can be performed in whole or in part by a synchronization software, such as the synchronization software 506 of FIG. 5, executing at a device. More specifically, the technique 1000 may be implemented in whole or in part by a clock selector tool of the synchronization software. The technique 1000 may be performed while an external speaker of the device executing the technique 1000 is enabled. The device can be one of the user devices 406 of FIG. 4, the first user device 902 of FIG. 9, or the second user device 904 of FIG. 9.

At 1002, a conference ID of a conference is received, such as from a conferencing server. The conference ID may be received when the device is joined to the conference. That is, the device may transmit to the server a request (i.e., a conference joining request) to join the conference. In response to joining the device to the conference, the server may transmit the conference ID to the device.

At 1004, the technique 1000 determines whether audio synchronization is to be performed. If audio synchronization is to be performed, the technique 1000 proceeds to 1006; otherwise, the technique 1000 proceeds to 1016 where the technique 1000 ends. In an example, the technique 1000 determines that synchronization is to be performed in response to determining that an external speaker of the device is enabled. In an example, a user of the device may indicate that the external speaker is enabled. That is, via a user interface associated with the conference, the user may provide an input that indicates that the audio stream of the conference is to be output via an external speaker. In an example, the technique 1000 determines that synchronization is to be performed in response to determining that the conference has not ended. In an example, the technique 1000 determines that synchronization is to be performed in response to determining that the device is receiving an audio stream (e.g., the device is not disconnected from a network via which the audio stream is received).

At 1006, the technique 1000 determines whether it is now time to transmit the self-clock. If not, then the technique 1000 proceeds to 1008; otherwise, the technique 1000 proceeds to 1010. That is, while the current clock receipt interval is not expired, then the technique 1000 continues to listen for and receive clock beacons, at 1008. At 1010, which indicates the end of the current clock receipt interval, the self-clock is transmitted. While not specifically shown, in some examples, the current clock receipt interval may be interrupted to transmit the self-clock.

At 1012, the master clock is selected. The master clock can be selected as described with respect to the clock selector tool 512 of FIG. 5. Selecting the master clock at 1012 may also be referred to as a synchronization event. At 1014, audio frames that may be buffered in the device are played (e.g., output) according to the master clock, such as described with respect to FIG. 5. As described above, each of the other devices determines the same audio frame and each of the other devices and the device contemporaneously (such as within milliseconds of each other) output the audio frame.

For simplicity of explanation, the technique 1000 is depicted and described herein as a series of steps or operations. However, the steps or operations in accordance with this disclosure can occur in various orders and/or concurrently. For example, transmitting the self-clock, at 1010, may precede receiving clock beacons from nearby devices, at 1006-1008.

Additionally, other steps or operations not presented and described herein may be used. Furthermore, not all illustrated steps or operations may be required to implement a technique in accordance with the disclosed subject matter. Some of the steps or operations may be performed in parallel or asynchronously. For example, selecting the master clock, at 1012, may be performed any time, and independent of the transmission of the self-clock 1012, the receipt of the clocks from nearby devices, at 1008, or both.

Figure 11:
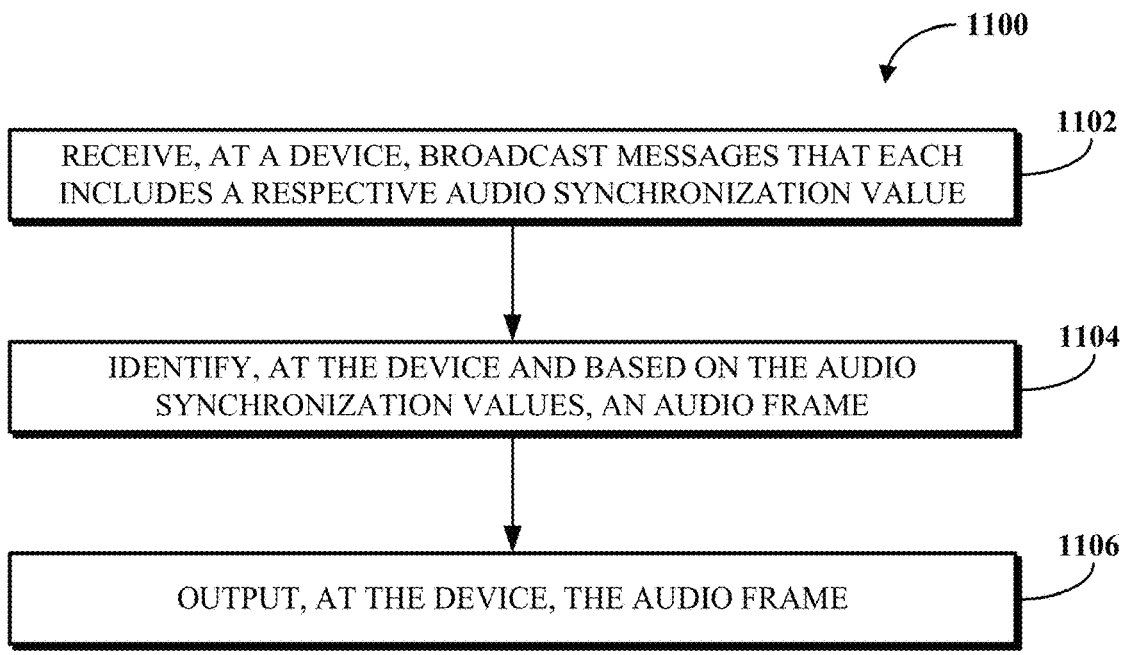
FIG. 11 is a flowchart of an example of a technique for use in audio synchronization of an audio stream of a conference amongst devices connected to a conference.

FIG. 11 is a flowchart of an example of a technique 1100 for use in audio synchronization of an audio stream of a conference amongst devices connected to a conference. The technique 1100 can be used at a device that is joined to the conference to select an audio frame of the audio stream to output. The device can be one of the user devices 406 of FIG. 4, the first user device 902 of FIG. 9, or the second user device 904 of FIG. 9. The technique 1100 can be executed using computing devices, such as the systems, hardware, and software described with respect to FIGS. 1-9.

The technique 1100 can be performed, for example, by executing a machine-readable program or other computer-executable instructions, such as routines, instructions, programs, or other code. The steps, or operations, of the technique 1100 or another technique, method, process, or algorithm described in connection with the implementations disclosed herein can be implemented directly in hardware, firmware, software executed by hardware, circuitry, or a combination thereof. The technique 1100 can be implemented in whole or in part by a synchronization software, such as the synchronization software 506 of FIG. 5.

For simplicity of explanation, the technique 1100 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1102, broadcast messages are received at the device. The broadcast messages are received from respective other devices joined to the conference. Each of the broadcast messages includes a respective audio synchronization value. The technique 1100 uses the respective audio synchronization values to identify (e.g., determine or select) an audio frame to output. More specifically, the respective audio synchronization values can be used to determine a timing for outputting the audio frame. The respective audio synchronization values can be respective device clocks, as described above, such as with respect to FIG. 8. In an example, each of the respective audio synchronization values is an audio frame number. In an example, the broadcast messages can include a conference identifier of the conference. In an example, the broadcast messages are monitored (e.g., listened) for within a clock receipt interval, as described above with respect to FIG. 5 and FIG. 6.

In an example, the audio stream is received over a first network and the broadcast messages may be received over a second network that is different from the first network. In an example, the broadcast messages may be received using a one-way communication protocol. In an example, the broadcast messages may be received over a BLE network. In an example, the device is physically co-located with the other devices, such as described with respect to FIG. 4.

At 1104, an audio frame of an audio stream of the conference is identified (e.g., selected or determined) at the device based on the audio synchronization values. In an example, the audio frame may be identified as described above with respect to the clock selector tool 512 of FIG. 5. For example, identifying the audio frame can include determining a time to output the audio frame. At 1106, the audio frame is output at the device according to the determined timing for the audio frame. In an example, the technique 1100 may further include transmitting, using the one-way communication protocol, a broadcast message that includes an audio synchronization value of the device. That is, the device may transmit its own self-block, as described above.

Figure 12:
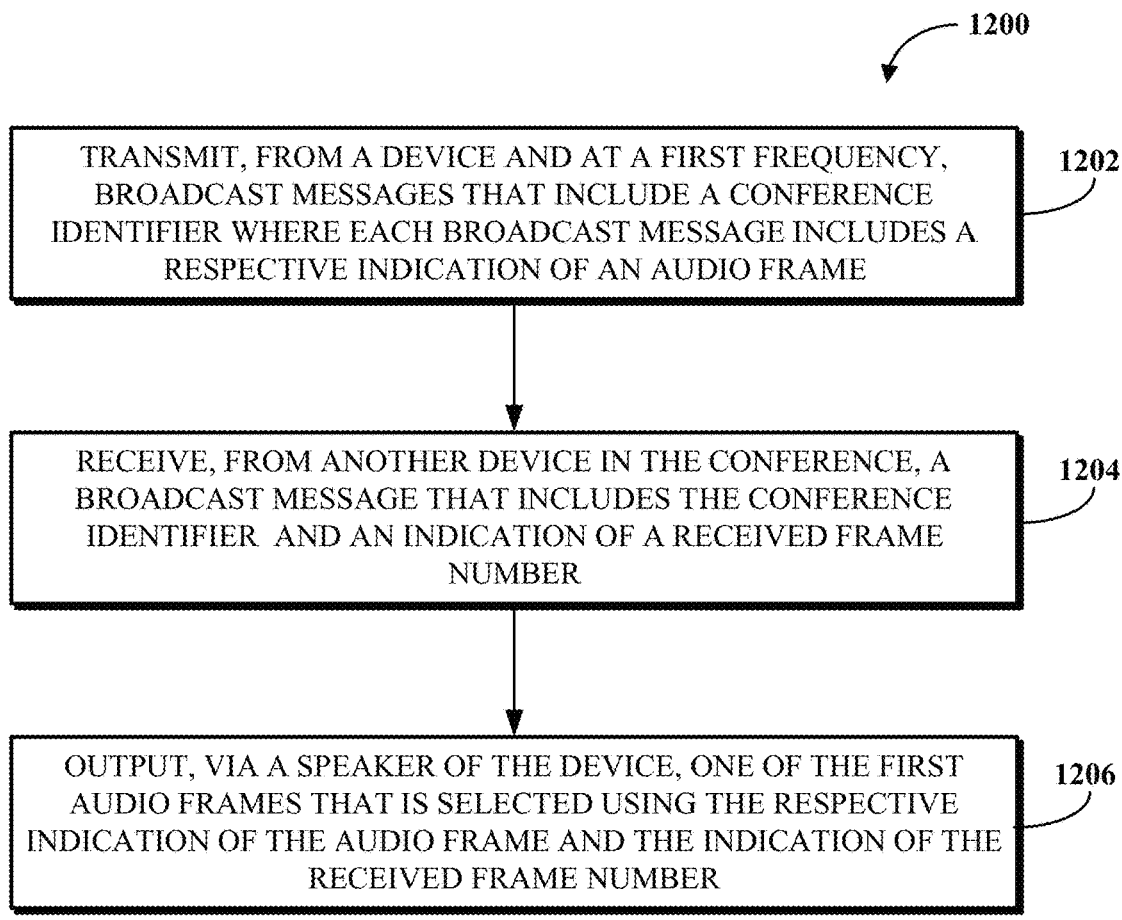
FIG. 12 is a flowchart of another example of a technique for use in audio synchronization of an audio stream of a conference amongst devices connected to a conference.

FIG. 12 is a flowchart of another example of a technique 1200 for use in audio synchronization of an audio stream of a conference amongst devices connected to a conference. The technique 1200 can be used at a device that is joined to the conference to select an audio frame of the audio stream to output. The device can be one of the user devices 406 of FIG. 4, the first user device 902 of FIG. 9, or the second user device 904 of FIG. 9. The technique 1200 can be executed using computing devices, such as the systems, hardware, and software described with respect to FIGS. 1-9.

The technique 1200 can be performed, for example, by executing a machine-readable program or other computer-executable instructions, such as routines, instructions, programs, or other code. The steps, or operations, of the technique 1200 or another technique, method, process, or algorithm described in connection with the implementations disclosed herein can be implemented directly in hardware, firmware, software executed by hardware, circuitry, or a combination thereof. The technique 1200 can be implemented in whole or in part by a synchronization software, such as the synchronization software 506 of FIG. 5.

For simplicity of explanation, the technique 1200 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1202, broadcast messages are transmitted from the device. The broadcast messages may be transmitted at a first frequency. In an example, each of the broadcast messages may be or include data as described with respect to the clock beacon portion 802 of FIG. 8. As such, each of the broadcast messages includes a conference identifier of the conference to which the device is joined; and each of the broadcast messages includes a respective indication of an audio frame of first audio frames of the audio stream of the conference. In an example, the respective indication of the audio frame can be a frame number that is currently output at the device. In another example, the respective indication of the audio frame can be a frame number that is to be output at the device after a predetermined period of time. In an example, the broadcast messages may be transmitted as described with respect to FIG. 6. In an example, the broadcast messages may be transmitted over a first network that is different from a second network used to receive the first audio frames. In an example, the broadcast messages are transmitted using a one-way transmission protocol. In an example, the broadcast messages are transmitted over a BLE network.

At 1204, a broadcast message that includes the conference identifier of the conference and an indication of a received frame number is received from another device in the conference. At 1206, one of the first audio frames is output via a speaker of the device. The one of the first audio frames can be selected based on the respective indication of the audio frame of the first audio frames and the indication of the received frame number.

In an example, the technique 1200 can further include omitting a transmission of a second broadcast message in response to determining that no audio frames were received since a time of transmission of a previous broadcast message. For example, and as described above with respect to FIG. 5, if no audio data of the conference is received since a last synchronization event, then the clock transmitting tool 508 of FIG. 5 does not transmit its self-clock during a next transmission time step. In an example, the technique 1200 can further include receiving second audio frames. Broadcast messages that include the conference identifier of the conference and where each of the broadcast messages includes a respective indication of a frame of the second audio frames can be transmitted at a second frequency that is different from (e.g., lower than) the first frequency.

Figure 13:
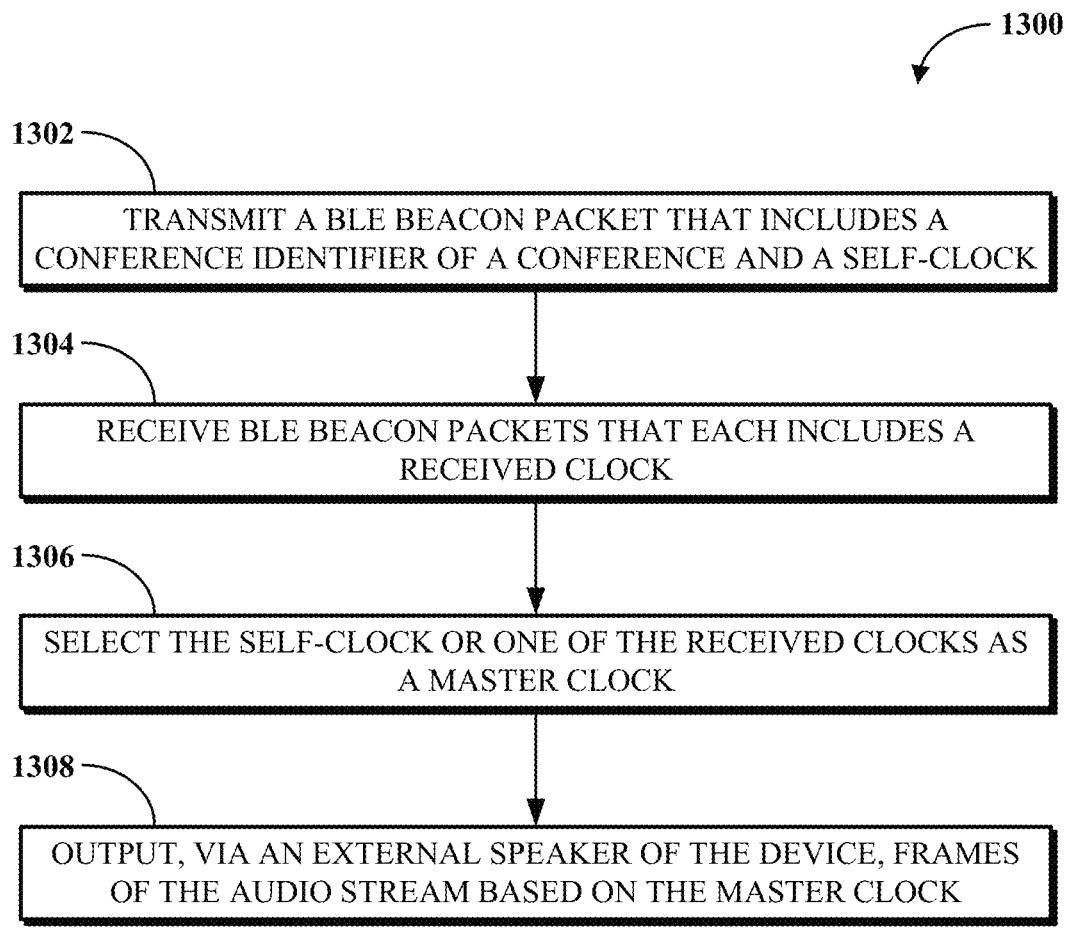
FIG. 13 is a flowchart of another example of a technique for use in audio synchronization of an audio stream of a conference amongst devices connected to a conference.

FIG. 13 is a flowchart of another example of a technique 1300 for use in audio synchronization of an audio stream of a conference amongst devices connected to a conference. The technique 1300 can be used at a device that is joined to the conference to select an audio frame of the audio stream to output. The device can be one of the user devices 406 of FIG. 4, the first user device 902 of FIG. 9, or the second user device 904 of FIG. 9. The technique 1300 can be executed using computing devices, such as the systems, hardware, and software described with respect to FIGS. 1-9.

The technique 1300 can be performed, for example, by executing a machine-readable program or other computer-executable instructions, such as routines, instructions, programs, or other code. The steps, or operations, of the technique 1300 or another technique, method, process, or algorithm described in connection with the implementations disclosed herein can be implemented directly in hardware, firmware, software executed by hardware, circuitry, or a combination thereof. The technique 1300 can be implemented in whole or in part by a synchronization software, such as the synchronization software 506 of FIG. 5.

For simplicity of explanation, the technique 1300 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1302, a BLE beacon packet is transmitted by the device. The BLE beacon packet can include a conference identifier of the conference and a self-clock indicative of an audio frame of an audio stream of the conference received at the device. The conference identifier can be used as a UUID in the transmitted BLE beacon packet, such as described with respect to the BLE beacon packet 808 of FIG. 8.

At 1304, BLE beacon packets (i.e., received BLE beacon packets) are received. Each of the received BLE beacon packets includes a received clock. The received clock is indicative of an audio frame of the audio stream at a device that transmitted the received BLE beacon packet. At 1306, the self-clock or one of the received clocks is selected as a master clock. The master clock can be selected as described above with respect the clock selector tool 512 of FIG. 5. As such, in an example, the master clock can correspond to a smallest frame number amongst audio frame numbers corresponding to the self-clock and the received clocks. At 1308, audio frames of the audio stream are output based on the master clock. That is, timing (i.e., output or play timing) of one or more of the audio frames may be adjusted according to the master clock. The audio frames are output via an external speaker of the device.

In an example, the received BLE beacon packets can be first received BLE beacon packets and the technique 1300 can further include receiving a collection of BLE beacon packets. The collection of received BLE beacon packets can include the first received BLE beacon packets and second received BLE beacon packets. Each of the first received BLE beacon packets includes the conference identifier; and none of the second received BLE beacon packets includes the conference identifier. As such, the technique 1300 ignores the second received BLE beacon packets in selecting the master clock. The second received BLE beacon packets are ignored because they may be received from devices that are not in the same conference as the device executing the technique 1300. In another example, the second received BLE beacon packets are ignored because they may not be packets relating to conferencing.

In an example, the technique 1300 can further include, responsive to determining that the external speaker of the device is disabled, stopping receiving of received BLE beacon packets. Stopping receiving of received BLE beacon can include disabling a transceiver of the device, such as the transceiver 502 of FIG. 5. Stopping receiving of received BLE beacon can include de-registering an interest in receiving clock beacons.

In an example, transmitted BLE beacon packets that include self-clocks are transmitted at a clock transmission cadence (i.e., frequency). Responsive to determining that audio data of the audio stream are not being received, stopping transmission of the transmitted BLE beacon packets. In an example, responsive to determining that the master clock is the self-clock, a request may be transmitted from the device to a server to increate a bit rate associated with at least one of the audio stream or a video stream of the conference.

Figure 14:
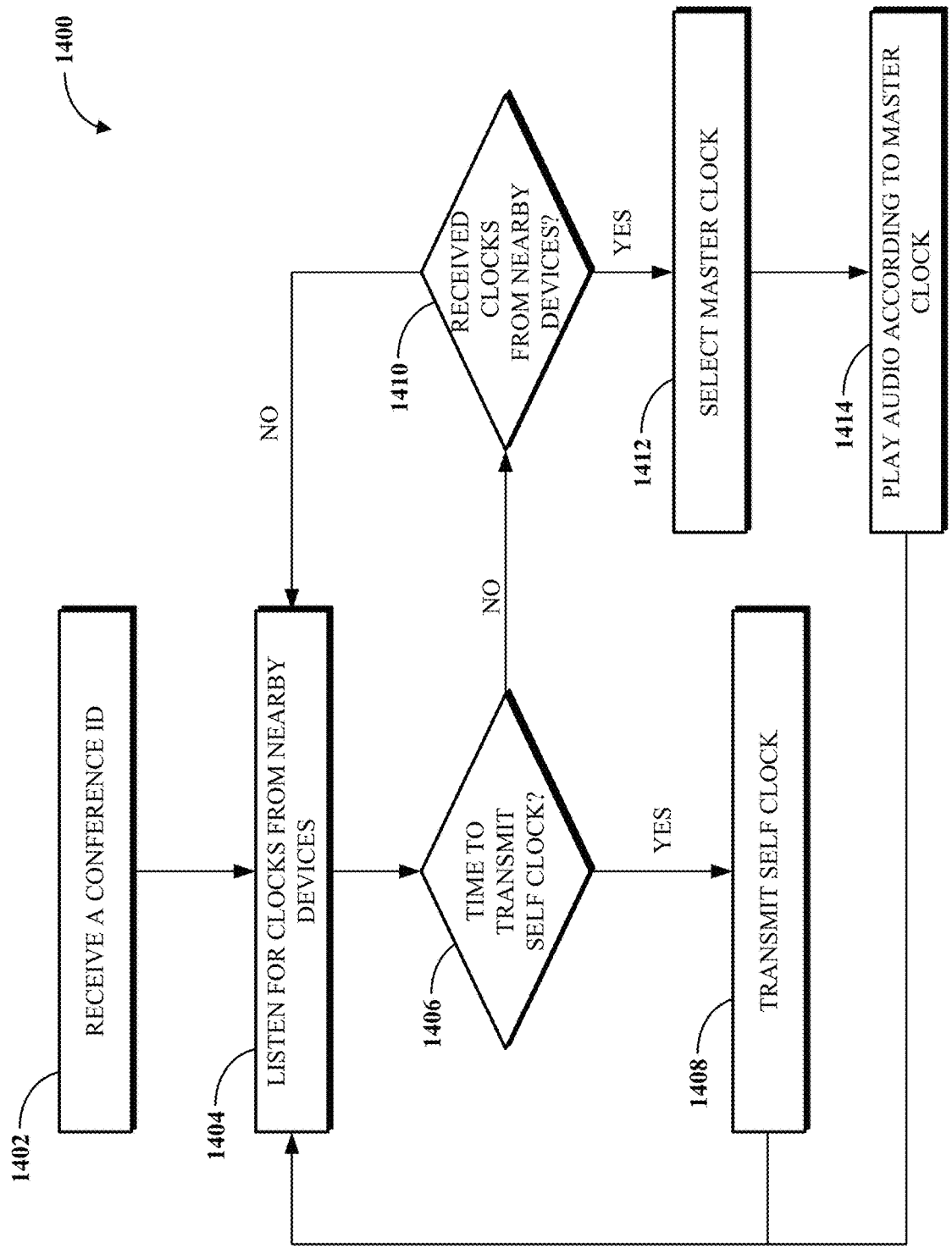
FIG. 14 is a flowchart of an example of a technique for synchronizing playback between nearby devices.

FIG. 14 is a flowchart of an example of a technique 1400 for synchronizing playback between nearby devices. The technique 1400 can be executed using computing devices, such as the systems, hardware, and software described with respect to FIGS. 1-9. The technique 1400 can be performed, for example, by executing a machine-readable program or other computer-executable instructions, such as routines, instructions, programs, or other code. The steps, or operations, of the technique 1400 or another technique, method, process, or algorithm described in connection with the implementations disclosed herein can be implemented directly in hardware, firmware, software executed by hardware, circuitry, or a combination thereof. The technique 1400 can be performed in whole or in part by a synchronization software, such as the synchronization software 506 of FIG. 5, executing at a device. More specifically, the technique 1400 may be implemented in whole or in part by a clock selector tool of the synchronization software. The technique 1400 may be performed while an external speaker of the device executing the technique 1400 is enabled. The device can be one of the user devices 406 of FIG. 4, the first user device 902 of FIG. 9, or the second user device 904 of FIG. 9.

At 1402, a conference ID of a conference is received. The conference ID can be received as described with respect to 1002 of FIG. 10. At 1404, clocks from nearby devices are listened for. The clocks can be listened for (or received) as described with respect to 1008 of FIG. 10. At 1406, the technique 1400 determines whether it is now time to transmit the self-clock. In an example, determining whether it is now time to transmit the self-clock can be as described with respect to 1010 of FIG. 10. If it is time to transmit the self-clock, then the technique 1400 proceeds to 1408 to transmit the self-clock. From 1408, the technique 1400 proceeds back to 1404 to listen for clocks in a next current clock receipt interval. If it is not time to transmit the self-clock, then the technique 1400 proceeds to 1410.

At 1410, the technique 1400 determines whether clocks from other devices were received during a current clock receipt interval. If clocks were received during the current clock receipt interval, then the technique 1400 proceeds to 1412 to select a master clock, which can be as described with respect to 1012 of FIG. 10. At 1414, audio frames are played (e.g., output) according to the master clock. The audio frames can be output as described with respect to 1014 of FIG. 10. If clocks were not received from other devices during the current clock receipt interval, at 1410, then the technique 1400 proceeds back to 1404.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method also includes transmitting, by a device, a Bluetooth low energy (BLE) beacon packet that includes a conference identifier of a conference and a self-clock indicative of an audio frame of an audio stream of the conference received at the device. The method also includes receiving BLE beacon packets that each includes a received clock indicative of an audio frame of the audio stream at a device that transmitted the received BLE beacon packet. The method also includes selecting the self-clock or one of the received clocks as a master clock. The method also includes outputting, via an external speaker of the device, audio frames of the audio stream based on the master clock. Other embodiments of this aspect include corresponding computer systems, apparatus, and computer programs recorded on one or more computer storage devices, each configured to perform the actions of the methods.

Implementations may include one or more of the following features. The method where the conference identifier is used as a universally unique identifier (UUID) in the transmitted BLE beacon packet. The received BLE beacon packets are first received BLE beacon packets, the method may include: receiving a collection of BLE beacon packets, where the collection of received BLE beacon packets includes the first received BLE beacon packets and second received BLE beacon packets, where each of the first received BLE beacon packets includes the conference identifier, and where none of the second received BLE beacon packets includes the conference identifier; and ignoring the second received BLE beacon packets in selecting the master clock. The method may include: responsive to determining that the external speaker of the device is disabled, stopping receiving BLE beacon packets. The method may include: transmitting transmitted BLE beacon packets that include self-clocks at a clock transmission cadence; and responsive to determining that audio data of the audio stream are not being received, stopping transmission of the transmitted BLE beacon packets. The master clock corresponds to a smallest frame number amongst audio frame numbers corresponding to the self-clock and the received clocks. The method may include: responsive to determining that the master clock is the self-clock, transmitting a request to a server to increate a bit rate associated with at least one of the audio stream or a video stream of the conference. Implementations of the described techniques may include hardware, a method or process, or computer software on a computer-accessible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    transmitting, by a device, a Bluetooth Low Energy (BLE) beacon packet that includes a conference identifier of a conference and a self-clock indicative of an audio frame of an audio stream of the conference received at the device;
    receiving BLE beacon packets that each includes a received clock indicative of an audio frame of the audio stream at a device that transmitted the received BLE beacon packet;
    selecting the self-clock or one of the received clocks as a master clock; and
    outputting, via an external speaker of the device, audio frames of the audio stream based on the master clock.

2. The method of claim 1, wherein the conference identifier is used as a Universally Unique Identifier (UUID) in the transmitted BLE beacon packet.

3. The method of claim 1, wherein the received BLE beacon packets are first received BLE beacon packets, the method further comprising:
    receiving a collection of BLE beacon packets, wherein the collection of received BLE beacon packets includes the first received BLE beacon packets and second received BLE beacon packets, wherein each of the first received BLE beacon packets includes the conference identifier, and wherein none of the second received BLE beacon packets includes the conference identifier; and ignoring the second received BLE beacon packets in selecting the master clock.

4. The method of claim 1, further comprising:

responsive to determining that the external speaker of the device is disabled, stopping receiving BLE beacon packets.

5. The method of claim 1, further comprising:

transmitting transmitted BLE beacon packets that include self-clocks at a clock transmission cadence; and responsive to determining that audio data of the audio stream are not being received, stopping transmission of the transmitted BLE beacon packets.

6. The method of claim 1, wherein the master clock corresponds to a smallest frame number amongst audio frame numbers corresponding to the self-clock and the received clocks.

7. The method of claim 1, further comprising:

responsive to determining that the master clock is the self-clock, transmitting a request to a server to increate a bit rate associated with at least one of the audio stream or a video stream of the conference.

8. A device, comprising:

a memory; and a processor, the processor configured to execute instructions stored in the memory to:

transmit, by the device, a Bluetooth Low Energy (BLE) beacon packet that includes a conference identifier of a conference and a self-clock indicative of an audio frame of an audio stream of the conference received at the device;

receive BLE beacon packets that each includes a received clock indicative of an audio frame of the audio stream at a device that transmitted the received BLE beacon packet;

select the self-clock or one of the received clocks as a master clock; and output, via an external speaker of the device, audio frames of the audio stream based on the master clock.

9. The device of claim 8, wherein the conference identifier is used as a Universally Unique Identifier (UUID) in the transmitted BLE beacon packet.

10. The device of claim 8, wherein the received BLE beacon packets are first received BLE beacon packets, the processor is further configured to execute instructions stored in the memory to:

receive a collection of BLE beacon packets, wherein the collection of received BLE beacon packets includes the first received BLE beacon packets and second received BLE beacon packets, wherein each of the first received BLE beacon packets includes the conference identifier, and wherein none of the second received BLE beacon packets includes the conference identifier; and ignore the second received BLE beacon packets in selecting the master clock.

11. The device of claim 8, the processor is further configured to execute instructions stored in the memory to:

responsive to determining that the external speaker of the device is disabled, stop receiving BLE beacon packets.

12. The device of claim 8, the processor is further configured to execute instructions stored in the memory to:

transmit transmitted BLE beacon packets that include self-clocks at a clock transmission cadence; and responsive to determining that audio data of the audio stream are not being received, stop transmission of the transmitted BLE beacon packets.

13. The device of claim 8, wherein the master clock corresponds to a smallest frame number amongst audio frame numbers corresponding to the self-clock and the received clocks.

14. The device of claim 8, wherein the processor is further configured to execute instructions stored in the memory to:

responsive to determining that the master clock is the self-clock, transmit a request to a server to increate a bit rate associated with at least one of the audio stream or a video stream of the conference.

15. A non-transitory computer-readable storage medium storing instructions operable to cause one or more processors to perform operations comprising, comprising:

transmitting, by a device, a Bluetooth Low Energy (BLE) beacon packet that includes a conference identifier of a conference and a self-clock indicative of an audio frame of an audio stream of the conference received at the device;

receiving BLE beacon packets that each includes a received clock indicative of an audio frame of the audio stream at a device that transmitted the received BLE beacon packet;

selecting the self-clock or one of the received clocks as a master clock; and outputting, via an external speaker of the device, audio frames of the audio stream based on the master clock.

16. The non-transitory computer-readable storage medium of claim 15, wherein the conference identifier is used as a Universally Unique Identifier (UUID) in the transmitted BLE beacon packet.

17. The non-transitory computer-readable storage medium of claim 15, wherein the received BLE beacon packets are first received BLE beacon packets, the operations further comprise:

receiving a collection of BLE beacon packets, wherein the collection of received BLE beacon packets includes the first received BLE beacon packets and second received BLE beacon packets, wherein each of the first received BLE beacon packets includes the conference identifier, and wherein none of the second received BLE beacon packets includes the conference identifier; and ignoring the second received BLE beacon packets in selecting the master clock.

18. The non-transitory computer-readable storage medium of claim 15, the operations further comprise:

responsive to determining that the external speaker of the device is disabled, stopping receiving BLE beacon packets.

19. The non-transitory computer-readable storage medium of claim 15, the operations further comprise:

transmitting transmitted BLE beacon packets that include self-clocks at a clock transmission cadence; and responsive to determining that audio data of the audio stream are not being received, stopping transmission of the transmitted BLE beacon packets.

20. The non-transitory computer-readable storage medium of claim 15, wherein the master clock corresponds to a smallest frame number amongst audio frame numbers corresponding to the self-clock and the received clocks.

* * * * *